United States Patent [19]

Benkmann

[11] 4,371,380

[45] Feb. 1, 1983

[54] PRESSURE SWING ADSORPTION PROCESS

[75] Inventor: Christian Benkmann, Gräfelfing, Fed. Rep. of Germany

[73] Assignee: Linde Aktiengesellschaft, Wiesbaden, Fed. Rep. of Germany

[21] Appl. No.: 143,241

[22] Filed: Apr. 24, 1980

[30] Foreign Application Priority Data

Apr. 24, 1979 [DE] Fed. Rep. of Germany ....... 2916585

[51] Int. Cl.³ .................................... B01D 53/04
[52] U.S. Cl. .................................. 55/26; 55/59; 55/68; 55/75
[58] Field of Search ............. 55/25, 26, 58, 62, 68, 55/74, 75, 59

[56] References Cited

U.S. PATENT DOCUMENTS

| | | | |
|---|---|---|---|
| 3,176,444 | 4/1965 | Kiyonaga | 55/58 X |
| 3,430,418 | 3/1969 | Wagner | 55/25 |
| 3,564,816 | 2/1971 | Batta | 55/26 |
| 3,596,438 | 8/1971 | Beukenkamp et al. | 55/59 |
| 3,636,679 | 1/1972 | Batta | 55/62 X |
| 3,717,974 | 2/1973 | Batta | 55/62 X |
| 3,738,087 | 6/1973 | McCombs | 55/62 X |
| 3,973,931 | 8/1976 | Collins | 55/62 X |

Primary Examiner—Robert H. Spitzer
Attorney, Agent, or Firm—Millen & White

[57] ABSTRACT

A pressure swing adsorption process conducted with plural cyclically reversible adsorbers, each of the adsorbers undergoing identical switching cycles. The switching cycles include sequentially at least one adsorption phase, at least two expansion phases, at least one desorption phase employing a purge gas which is foreign and inert relative to the material adsorbed in the adsorbent phase, a displacement phase employing a gas obtained from an expansion phase of one of the adsorbers to displace the purge gas, and at least one pressure build-up phase.

9 Claims, 4 Drawing Figures

PRESSURE SWING ADSORPTION PROCESS

BACKGROUND OF THE INVENTION

The invention relates to a pressure swing adsorption process for the purification or separation of gaseous mixtures with the use of plural cyclically reversible adsorbers undergoing through substantially identical cycles.

Such a process is known, for example, from DAS No. 2,038,261. The process described therein, operating with four cyclically reversible adsorbers, comprises, following the single adsorption phase, four expansion phases, a desorption phase, and three pressure buildup phases. The desorption takes place by purging the adsorber with the gaseous mixture discharged during the second expansion phase. The final expansion phase gas is blown off as the purging gas enriched during the adsorbed gas with the desorbing components. The first and third expansion phases take place respectively in pressure equalization with other adsorbers which are then in their first or second pressure buildup phases, respectively. The second expansion phase takes place concurrently, based on the direction of gas flow during adsorption, the fourth and final expansion phase takes place countercurrently. The adsorption front is still within the adsorber packing at the end of the adsorption phase. Breakthrough of the adsorption front occurs at the earliest, after the two first expansion phases have run their course. The full loading of the adsorber filling accordingly occurs only at a pressure which is greatly reduced as compared to the adsorption pressure. The adsorption filling capacity of the components to be adsorbed is thus utilized only up to a certain degree, since the quantity of adsorbed components decreases as the pressure decreases. The object of this special mode of operation resides in obtaining a purging gas to enhance the desorption, which gas does not contain the components to be desorbed, and in the prior art exhibits the composition of the purified product gas. As a consequence, a considerable portion of the product gas to be obtained is lost by being blown off into the atmosphere, primarily during the desorption phase conducted with a purging stream, but also during the final expansion phase, since the expansion gas discharged still contains proportions of the product gas to be obtained.

SUMMARY OF THE INVENTION

The main object of the invention resides in making providing a process of the type described hereinabove which is distinguished by an optimum exploitation of the adsorption capacity of, the adsorber filling, as well as by minimizing losses in product gas.

This object is attained according to the invention by conducting the desorption by purging with a foreign gas, following the desorption phase with a displacement phase, and displacing the foreign gas with the aid of a gas or gaseous mixture discharged during an expansion phase.

The use of these measures ensures that no product gas is lost during desorption.

Furthermore, the cause of the above-described negative effects on the adsorption capacity of the adsorber filling is eliminated, because the purging gas in the process of the invention is made available in a fundamentally different from the method of the prior art. The adsorption front can be extended almost through the entire packing as early as during the adsorption phase, so that the adsorption takes place at the highest pressure occurring in the total process. The breakthrough of the adsorption front then takes place at the beginning of the first expansion phase which generally is simultaneous to the penultimate pressure buildup phase of another adsorber.

The foreign gas used for purging the adsorber should be an inert gas of low adsorbability relative to the adsorbed component. The foreign gas should not be harmful to the environment in the event it is discharged to the atmosphere. If it is intended to separately obtain the adsorbed component, in addition to a purification of the non-adsorbed product gas, it is recommended to use a foreign gas separable from the adsorbed component to be desorbed in a technically and economically simple way.

After termination of the desorption phase, which will generally take place at the lowest process pressure, the adsorber is filled with foreign gas. To prevent contamination of the product gas, to be obtained by the adsorptive purification, with foreign gas, a displacement phase is conducted directly following the desorption phase. In this step, the foreign gas present in the void volume of the adsorber filling is displaced through one end of the adsorber, by the introduction of expansion gas at the opposite end of the adsorber. After finishing the displacement phase the adsorber is accordingly filled with a gaseous mixture consisting merely of components of the gaseous mixture to be purified. The pressure buildup phases then follow directly.

An advantageous embodiment of the invention resides in using the gas or gaseous mixture discharged during the final expansion phase in the displacement. Since this final expansion gas also generally contains proportions of the product gas to be obtained, the aforementioned measure aids in the recovery of these proportions to an extensive degree. The resulting yield of product gas is correspondingly high. For the same reason it is recommended to proceed so that the pressure difference producted between the beginning and the end of the expansion phase, coupled with the displacement phase is approximately equal to the pressure in the adsorber at the end of the desorption phase. The expansion gas volume used for displacement is in this case approximately as large as the foreign gas volume to be displaced. The loss of expansion gas can thereby be reduced to zero in the ideal case. The higher the purity requirements regarding the proportions of foreign gas still contained in the product gas, the more one must, however, deviate from the just mentioned rule. This results because the displacement front, defined as the zone wherein proportions of foreign gas as well as expansion gas are present to a marked degree, will exhibit a certain width, the displacement gas volume must be correspondingly increased to ensure a perfect displacement of the foreign gas. Depending on the width of this displacement front, the additional proportion will constitute a smaller or larger percentage of the adsorber volume.

The process of the invention can be applied advantageously in all cases wherein the product gas remaining after separation of certain components from the gaseous mixture to be treated is to be obtained as completely as possible, and where simultaneously adequate amounts of foreign gas are available, i.e. of a gas not contained in the gaseous mixture to be treated by adsorption and exhibiting poor adsorbability as compared to the adsorbed component or components of this mixture. In this connection, it is of less importance whether the components to be separated are discarded or are to be obtained, in turn, as the second product gas fraction.

The process of the invention is especially applicable if a suitable foreign gas is readily available. Thus, in many chemical and biochemical methods oxygen is required which is obtained by air fractionation. If this oxygen is not completely consumed in the reaction, the problem frequently occurs of separating, on the one hand, the reaction products from the oxygen and of recycling, on the other hand, the remaining oxygen into the reaction in order to reduce the costs of air fractionation as much as possible. In the separation of gaseous reaction products from such a gaseous stream stemming from an oxygen-consuming reaction with the adsorbed stream still containing an oxygen proportion worthwhile for recycling into the reaction, the oxygen to be introduced into the reaction can be obtained by air fractionation, and nitrogen produced during the course of the air fractionation can be used, in particular, as the foreign gas for conducting the desorption. In this case, the very extensive recovery of the recycle oxygen, due to particular the use of the invention, simultaneously permits minimizing of the costs of making all the oxygen required available and, on the other hand, permits the simultaneous, suitable use of the nitrogen which is obtained as a byproduct during this process.

One example of such an oxygen-consuming reaction is the production of ozone. The gaseous mixture discharged from the ozonizer, which operates in most cases on the basis of electrical discharges, consists of a large amount of molecular oxygen and contains a small percent of ozone. The ozone can be separated, when using the process of the invention, from the oxygen in a pressure swing adsorption plant using nitrogen as the purge gas for desorption. This nitrogen, just as the oxygen to be fed to the ozonizer, is made available with the aid of an air fractionation plant. Such ozone manufacturing methods, including the use of nitrogen obtained in an air fractionation plant as the purging gas to support desorption of ozone, are per se known (see, for example, U.S. Pat. No. 2,872,397), but the mode of operation of the process of this invention is not known even in this specific application. Thus, the adsorption cycle of the process described in the cited U.S. Pat. No. 3,872,397 consists of an adsorption phase and a desorption phase with respectively interposed evacuation phases. During the evacuation phase following the adsorption phase, the gaseous mixture consisting of oxygen and ozone remaining in the void volume is withdrawn with a vacuum pump and recycled into the ozonizer. Subsequently, desorption which is conducted by purging with nitrogen, the adsorber undergoes evacuation through the use of a vacuum pump to remove the nitrogen remaining in the adsorber and to prepare for the subsequent adsorption phase. In this mode of operation, it is a disadvantage that a vacuum pump must be constantly operated to remove alternatingly ozone-enriched oxygen or nitrogen. Furthermore, the ozonizer is loaded with a certain proportion of recycled ozone which, of course, has a negative effect on the ozone yield.

The process according to the invention is also applicable to the removal of carbon dioxide and steam from hydrogen-enriched gases. The application particularly applies if these gases are obtained by partial oxidation of hydrocarbon-containing materials. In this case an air fractionation plant can be used advantageously for providing the oxygen required for the partial oxidation as well as the nitrogen to be employed as the purging gas for the adsorption. Another application of the process of the invention is within the framework of the production of organic acids by biological oxidation of polysaccharides with oxygen.

BRIEF DESCRIPTION OF THE DRAWINGS

The following examples relate to the two last-mentioned use possibilities.

DETAILED DESCRIPTION OF THE INVENTION

Figure 1:
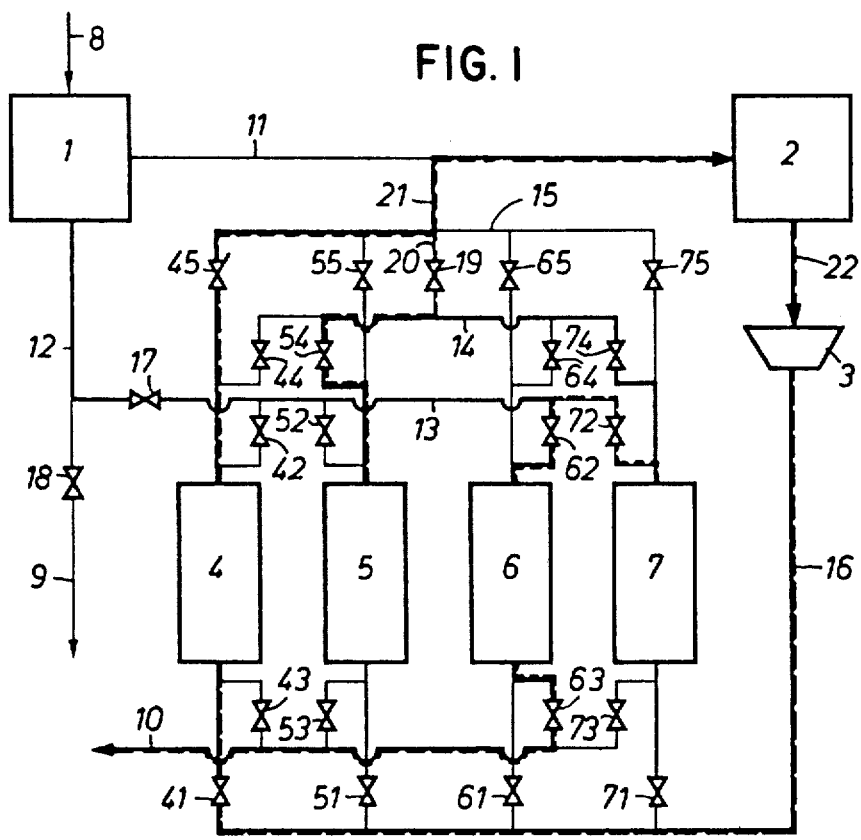
FIG. 1 schematically illustrates a process by means of which an oxygen-containing recycle gas from a fermentor is to be cleansed of carbon dioxide in an adsorption plant consisting of four adsorbers.

The process illustrated in FIG. 1 serves to produce organic acids from polysaccharides by biological oxidation with oxygen. Air is fed through feed conduit 8 to air fractionation plant 1, preferably a low-temperature rectification plant to produce the required oxygen. Fermentation is conducted in a fermentor 2. A compressor 3 serves for compressing the recycle gas discharged from the fermentor, the recycle gas containing oxygen and, as the component to be removed, carbon dioxide. Cyclically reversible adsorbers 4, 5, 6, 7 remove the $CO_2$ from the recycle gas so that the returned oxygen is free of products from the fermentation reaction.

The fermentor is charged through a conduit 11 with 3.6 kmol/h of highly enriched oxygen stream, consisting of 98% by volume of oxygen and 2% by volume of nitrogen and argon, from the air fractionation plant 1. This 3.6 of the stream is combined with 18.7 kmol/h of purified recycle oxygen stream fed through conduits 15 and 21. This recycle oxygen consists of 88.5% by volume of oxygen and 11.5% by volume of nitrogen and argon. Both oxygen streams are at a pressure of 4.5 bar. The combined streams, i.e., 22.3 kmol/h of a gaseous stream consisting of 90% by volume of oxygen and 10% by volume of nitrogen and argon is introduced into the fermentor. A portion of the introduced oxygen is reacted to carbon dioxide in the fermentor. Via conduit 22, a gaseous stream of 21.1 kmol/h consisting of 84.6% by volume of oxygen, 10.6% by volume of nitrogen and argon, and 4.8% by volume of carbon dioxide is withdrawn through conduit 22, compressed in compressor 3 from 3.5 bar to 5 bar, and fed to the adsorption plant through a conduit 16. This plant consists essentially of the four cyclically reversible adsorbers 4 through 7, each of which is filled with a packing of large-pore silica gel selectively retaining carbon dioxide entrained in the recycle gas stream.

Figure 2:
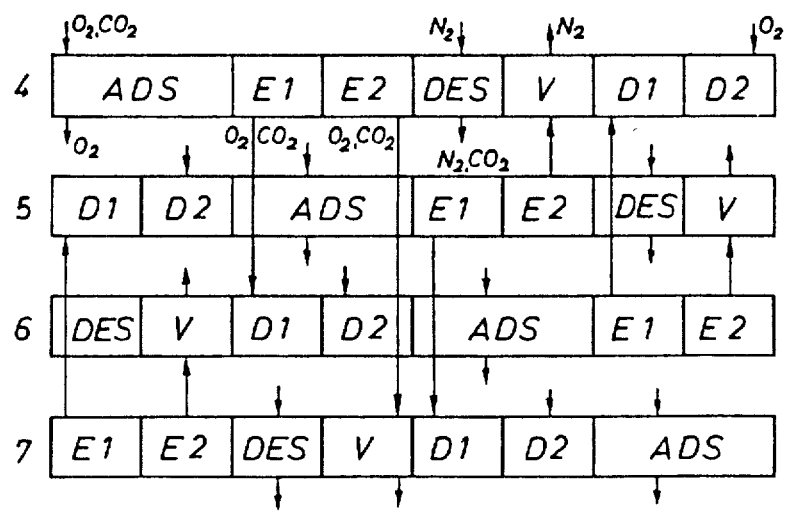
FIG. 2 is the time sequence diagram for the process illustrated in FIG. 1.

The respectively phase-shifted switching cycles of the adsorbers 4–7 are illustrated in the time sequence diagram of FIG. 2. Each of the four adsorbers represents one of the horizontal bars. The time proceeds from the left toward the right. In FIG. 1, boldly drawn lines and dashed lines, respectively, illustrate the two first eighths of an adsorption cycle succeeding each other on the leftmost side in the diagram of FIG. 2. The bolt line corresponds to the first eighth wherein the adsorber 4 is in the first half of the adsorption phase ADS, the adsorber 5 is in the first pressure buildup phase D1, the adsorber 6 is in the desorption phase DES, and the adsorber 7 is in the first expansion phase E1. The dashed line corresponds to the second eighth wherein the adsorber 4 is in the second half of the adsorption phase ADS, the adsorber 5 is in the second pressure buildup phase D2, the adsorber 6 is in the displacement phase V, and the adsorber 7 is in the second expansion phase E2.

The oxygen stream to be purified, which exits from the fermentor, is accordingly introduced into adsorber 4 through conduits 22 and 16, and through an opened valve 41, or if either adsorber 5, 6, or 7 is in this phase, respectively through one of then opened valves 51, 61, or 71, is freed in the adsorber 4 of carbon dioxide, and returned to the fermentor through an opened valve 45, or in the case of the appropriate phase of the other adsorbers, through one of respective valves 55 or 75, as well as conduits 15, 21, and 11. During this time the adsorber 7 is in the first expansion phase E1 following directly the adsorption phase ADS. Adsorber 7 is relieved of the adsorption pressure to an intermediate pressure through its outlet end through an opened valve 74, a pressure equalizing conduit 14, as well as an opened valve 54 or 44, 64 or 74 respectively in the case of adsorber 4 6 or 7 during its corresponding phase, during which time the adsorber 5, which is in the first pressure buildup phase D1, is simultaneously raised, through its outlet end, to approximately the aforementioned intermediate pressure. The gaseous mixture discharged from the adsorber 7 during this pressure equalizing process corresponds in its composition approximately to the gaseous mixture flowing in conduit 16. Since the adsorbers during the adsorption phase ADS are each loaded to the level directly before the breakthrough of the carbon dioxide and the adsorption front reaches a certain width, the discharged pressure equalizing gas is therefore, somewhat more enriched in oxygen as compared to the gaseous mixture flowing in conduit 16. The intermediate pressure reached at the end of the pressure equalization is about 3 bar. In the meantime, the adsorber 6 is in its desorption phase DES. During this step, dry nitrogen, which is the foreign gas, at a pressure of about 1 bar from the air fractionation plant 1 is fed to this adsorber 6 through its outlet end as well as through a conduit 12, an opened valve 17, a conduit 13, and through an opened valve 62, or in the case of adsorbers 4 and 5, through valves 42 or 52 respectively. This nitrogen absorbs the desorbing carbon dioxide and entrains the carbon dioxide by way of an opened valve 63 as well as a residual gas conduit 10. This residual gas can generally be blown off into the atmosphere. The total amount of nitrogen fed to the adsorption plant through valve 17 is about 8 kmol/h. The introduction of this total amount, though, does not take occur continuously since the desorption phases do no follow one another without interruption. Excess nitrogen is discharged into the atmosphere through a control valve 18, as well as a conduit 9, or stored for other purposes.

When the adsorber 4 enters the second half of the adsorption phase, the second expansion phase E2 of the adsorber 7 begins. The outlet end of adsorber 7 is connected through an open valve 72, conduit 13, as well as an opened valve 62 to the outlet end of the adsorber 6 which at this time enters the displacement phase V. The expansion gas, which is at a pressure of about 3 bar at the beginning of the second expansion phase, and which initially has approximately the composition of the gaseous mixture flowing in conduit 16 and exhibits toward the end of the second expansion phase an increasing carbon dioxide content, displaces the nitrogen present in adsorber 6 through the inlet end thereof, through the open valve 63, or through either of valve 43, 53 or 73 if the other adsorbers are in their corresponding phase, as well as the residual gas conduit 10. The displacement phase V is conducted so that the desired degree of displacement is reached as soon as the adsorber 7 reaches at a pressure of about 1 bar. In the normal case, all the nitrogen will have then escaped from the adsorber 6, the void volume of the latter then being filled essentially with oxygen. The pressure in adsorber 6 is in this case about 1 bar. This is the lowest pressure occurring in the process. The adsorber 6 is thus prepared for the beginning of pressure buildup phases. While this adsorber is still in the displacement phase V, the adsorber 5 passes through the second pressure buildup phase D2. Its outlet end is in communication with the conduit 21 through the opened valve 54, conduit 14, the opened valve 19, and conduit 20; purified oxygen coming from adsorber 4 flows in this conduit 21. A portion of this oxygen is now branched off and conducted countercurrently into the adsorber, referring to the direction of flow opposite to the normal flow of the gaseous stream in the adsorption phase. This adsorber 5 is thus brought, from the intermediate pressure of about 3 bar, reached toward the end of the first pressure buildup phase D1, to a pressure of about 4.5 bar. The oxygen stream branched off through conduit 20 during the second pressure buildup phase D2 amounts to about 10% of the purified oxygen discharged through valve 45, or respectively through valves 55,65, or 75 for adsorbers 5, 6 and 7. If the fermentor 2 is to be charged with constant quantities of oxygen, it is recommended to install a buffer tank in conduit 11 downstream with respect to conduit 21, and to maintain the amount of oxygen to be withdrawn therefrom and to be fed to the fermentor constant by way of a control valve.

Figure 3:
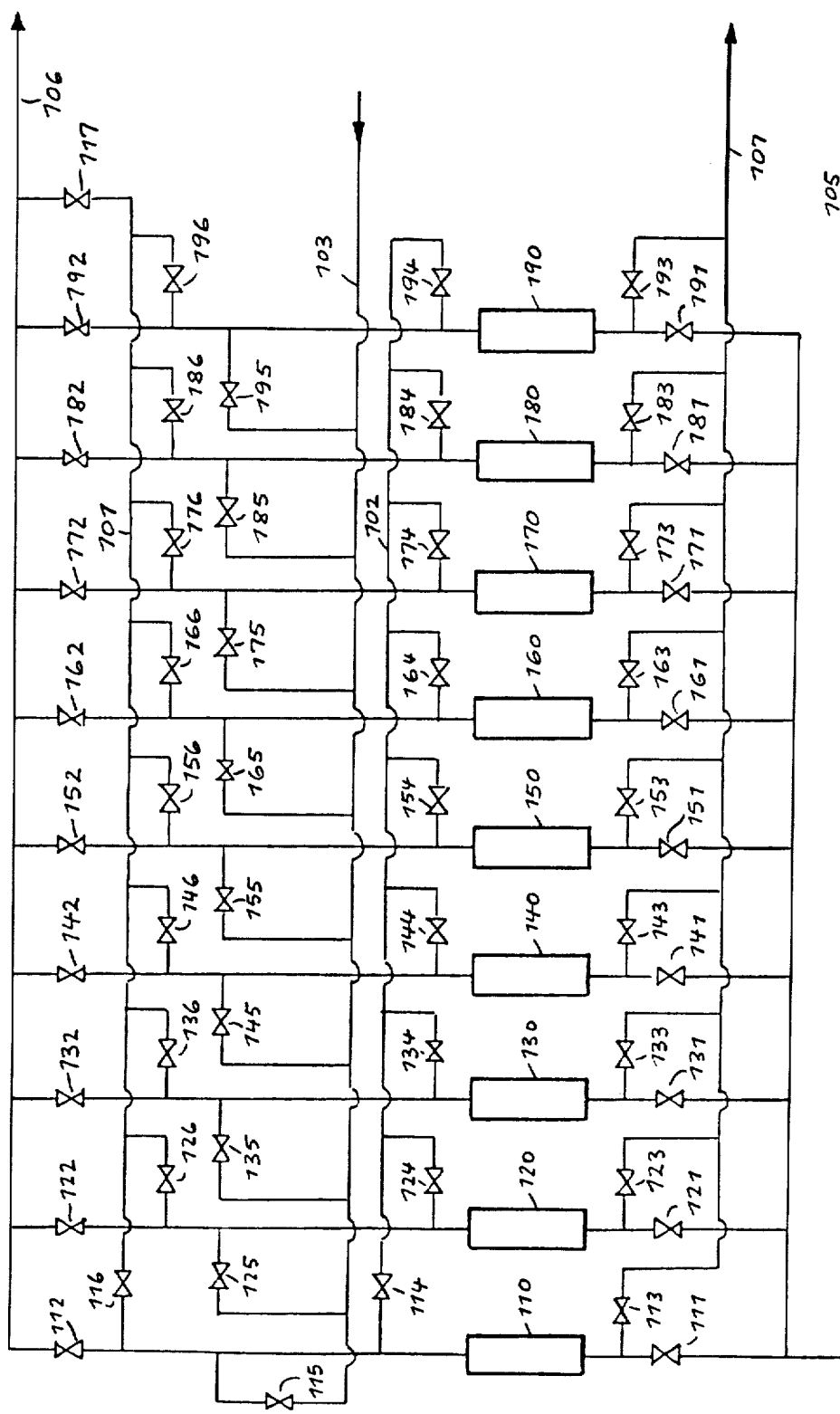
FIG. 3 schematically illustrates a process by means of which a hydrogen-enriched gas produced by partial oxidation is to be cleansed of carbon dioxide and steam in an adsorption plant consisting of novel adsorbers.

FIG. 3 shows nine cyclically reversible adsorbers 110 through 190 which pass, with temporal shift, respectively through identical switching cycles. These are connected respectively through valves 111 through 191 to a raw gas conduit 105 serving to feed the still unpurified hydrogen-enriched gas. The inlet sides of the adsorbers 110-190 are also connected to a residual gas conduit 107 through valves 113-193. The outlet sides of adsorbers 10-190 are first connected through valves 112-192 to a product conduit for the hydrogen-enriched gas cleansed from carbon dioxide and steam. Furthermore, these outlet sides are in communication through valves 114-194 with a pressure equalizing conduit 102; through valves 116-196 with a conduit 101 serving in part as a pressure equalizing conduit, in part as a displacement gas conduit, and in part as a pressure buildup conduit, the conduit connected to the product gas conduit 106 by way of a valve 117; and via valves 115-195 with a purging gas conduit 103.

By means of the raw gas conduit 105, 4500 kmol/h of a hydrogen-enriched gas is introduced into the adsorbers, for example, which consists of about 65% by volume of hydrogen, about 10% by volume of carbon monoxide, and about 25% by volume of carbon dioxide and is saturated with steam. This hydrogen-enriched gas is under a pressure of 25 bar and has a temperature of 303 K. This gas stems from a partial oxidation of hydrocarbon-rich materials, for example hydrocarbon oils, with subsequent partial conversion of the carbon monoxide to carbon dioxide. The hydrogen-enriched gas is to be free of carbon dioxide and steam as extensively as possible by means of the adsorption, to be subsequently subjected to a hydrogen-carbon monoxide separation. In the adsorbers, containing large-pore silica gel, carbon dioxide and water vapor are preferably retained. Then, 3260 kmol/h of a purified gas is discharged through the product gas conduit 106, this gas now consisting of about 86.88% by volume of hydrogen, about 13.1% by volume of carbon monoxide, and merely about 0.02% by volume of carbon dioxide. The water vapor proportion having dropped to below 1 part by volume per million. Through the purging gas conduit 103, 1000 kmol/h of gaseous nitrogen of 1.1 bar and 303 K. is introduced, which is produced, just as the oxygen required for the partial oxidation, in an air fractionation plant.

Figure 4:
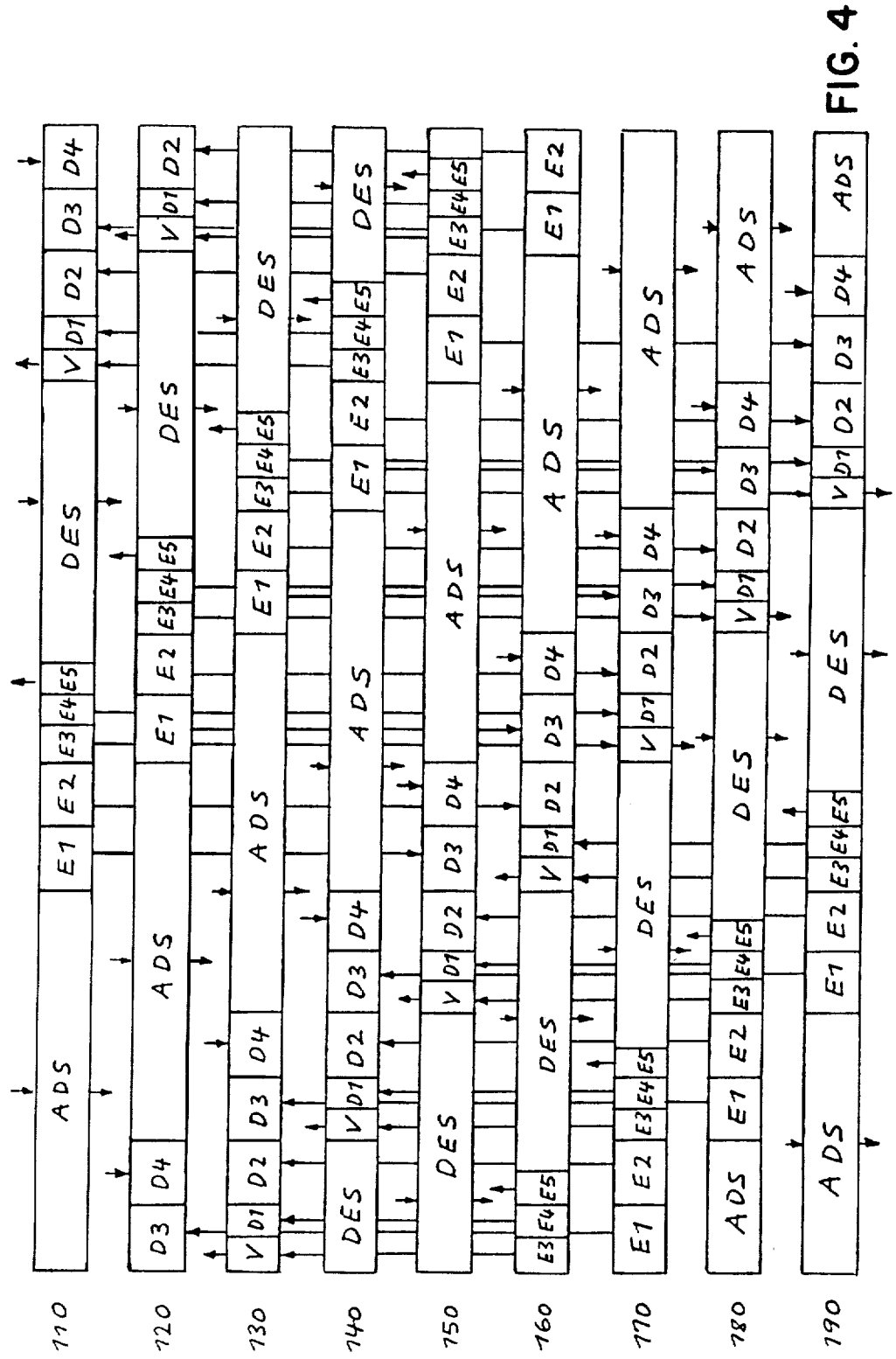
FIG. 4 is the time sequence diagram for the process illustrated in FIG. 3.

In FIG. 4 the time sequence diagram is illustrated corresponding to FIG. 3. The nine horizontal bars correspond to the nine adsorbers 110-190. The cycles identical for all adsorbers can be subdivided into 36 respective diminutive functonal units or beats. An adsorption phase ADS having a duration of 12 beats is followed by a first expansion phase E1 of a duration of 2 beats, operated in pressure equalization with a third pressure buildup stage D3 of another adsorber; a second expansion phase E2 of a duration of likewise 2 beats, operated in pressure equalization with a second pressure buildup stage D2 of a further, other adsorber; a third expansion stage E3 having a duration of one beat, the expansion gas of which is conducted, following the desorption phase DES of another adsorber, through the latter during the subsequent displacement phase V; a fourth expansion phase E4 having likewise the duration of one beat, operated in pressure equalization with a first pressure buildup stage D1 of the same other adsorber; a fifth expansion stage E5 having a duration of one beat, the expansion gas of which is blown off through the residual gas conduit 107 into the atmosphere; and finally, a desorption phase DES, during which nitrogen is conducted as the purging gas through the corresponding absorber to entrain the initially adsorbed steam as well as the likewise initially adsorbed carbon dioxide. The purging gas, which is a foreign gas with respect to the feed gas to be purified, is displaced from the adsorber in the subsequent displacement phase V. By means of four subsequent pressure buildup phases D1 through D4, the adsorber is brought back to adsorption pressure.

Adsorption takes place in adsorber 110 through the opened valves 111 and 112; the first expansion E1 takes place cocurrently through the opened valve 114 and the pressure equalizing conduit 102, as is the second expansion E2. The expansion gas of the third expansion phase E3 flows off through the opened valve 116 and the conduit 101 to be conducted thereafter through a corresponding opened valve into another adsorber to displace purging gas at that location. The expansion gas of the fourth expansion phase E4 is likewise discharged through the opened valve 116 and the conduit 102 to effect a first pressure buildup D1 in the adsorber which previously was in the displacement phase. The last expansion gas of the fifth expansion phase E5, presently already at a very low pressure and containing desorbed components, is finally withdrawn through the opened valve 113 and the residual gas conduit 107. The nitrogen serving as the purging gas passes into the adsorber through the purging gas conduit 103 as well as the opened valve 115 and leaves the adsorber through the opened valve 113 and the residual gas conduit 107. During the subsequent displacement V of the purging gas, the displacement gas flows through the opened valves 116 and 113. The first pressure buildup D1 occurs place through the opened valve 116, the second pressure buildup D2 through the opened valve 114, as does the third pressure buildup D3. The fourth and last pressure buildup D4 is conducted with purified product gas, through the conduit 101 and the opened valves 117 and 116.

The procedure takes place correspondingly in case of the remaining adsorbers.

The last-described process is distinguished by the fact that the nitrogen, obtained anyway during the course of the pretreatment of the feed gas with the aid of the air fractionation plant, can be used advantageously as the purging gas, whereby the losses in purified product gas can be lowered to a minimum. Purified product gas is merely required for just the last pressure buildup D4. The volume required for this purpose is relatively small since five expansion stage E1 through E5 are provided and the pressure difference still existing at the beginning of the last pressure buildup D4 is thus likewise correspondingly small.

I claim:

1. In a pressure swing adsorption process for the purification or separation of gaseous mixtures, using plural, cyclically reversible adsorbers, each of which passes through identical switching cycles, wherein each switching cycle comprises sequentially at least one adsorption phase, two expansion phases, a desorption phase, and a pressure buildup phase, the improvement comprising effecting desorption by purging with a foreign gas, following the desorption with a displacement phase, and conducting the displacement of the foreign gas with a gas or gaseous mixture discharged during an expansion phase.

2. A process according to claim 1, characterized in that the displacement is conducted with the aid of the gas or gaseous mixture discharged during the final expansion phase.

3. A process according to claim 1, or 2, characterized in that the pressure difference produced between the beginning and the end of the expansion phase coupled with the displacement phase is approximately equal to the pressure ambient at the end of the desorption.

4. A process to claim 3 comprising the separation of gaseous reaction products from a gaseous stream stemming from an oxygen-consumming reaction and still containing oxygen, the oxygen proportion of the gaseous stream to be recycled into the reaction, wherein the oxygen to be fed to the reaction is obtained by air fractionation and the nitrogen obtained during the course of the air fractionation is utilized as the foreign gas to support the desorption phase.

5. A process according to claims 1 or 2 for the separation of gaseous reaction products from a gaseous stream stemming from an oxygen-consuming reaction and still containing oxygen, the oxygen proportion of which gaseous stream is to be recycled into the reaction, wherein the oxygen to be fed to the reaction is obtained by air fractionation, and nitrogen obtained during the course of the air fractionation is utilized as the foreign gas to support the desorption.

6. A process according to claim 1 or 2 comprising the separation of hydrogen from a hydrogen enriched gaseous stream containing carbon dioxide and steam, and stream resulting from a partial oxidation of hydrocarbon-rich materials, and the foreign purge gas comprises nitrogen.

7. A process according to claim 1 or 2 wherein the components purged by the foreign purge gas in the desorption step are organic acids adsorbed from a gaseous stream resulting from biological oxidation of polysaccharides with oxygen.

8. A process according to claim 1 wherein said foreign gas comprises an inert gas of low adsorbability relative to the gaseous component adsorbed.

9. In a pressure swing adsorption process for the purification or separation of gaseous mixture, said process employing plural, cyclically reversible adsorbers, each adsorber passing through identical switching cycles with each cycle comprising sequentially at least one adsorption phase, two expansion phases, a desorption phase, and a pressure buildup phase, the improvement comprising the steps of purging each on adsorber during the desorption phase thereof with a foreign purge gas of low adsorbability relative to the gaseous component adsorbed, and displacing the foreign purge gas with a gas or gaseous mixture discharged during the expansion phase of another one of the plural adsorbers.

* * * * *